United States Patent Office 3,418,088
Patented Dec. 24, 1968

3,418,088
SULFURYL HALIDES AND PROCESS
Raymond J. Shozda, Wilmington, Del., assignor to E. I. du Pont de Nemours and Company, Wilmington, Del., a corporation of Delaware
No Drawing. Filed Mar. 21, 1966, Ser. No. 535,724
8 Claims. (Cl. 23—357)

ABSTRACT OF THE DISCLOSURE

New chemical compounds having the formula $XSO_2N_3$, wherein X is Cl or F, are prepared by bringing together at least one ionic azide, i.e., $N_3^-$, and at least one of (a) $SO_2X_2$, wherein X is Cl or F, and (b) $SO_2$ and at least one chlorine or fluorine carrier less active in the system than $Cl_2$ and $F_2$, at temperatures preferably within the range of 0° to 50° C. and at preferred pressures of 1 to 5 atmospheres. The new compounds may be used as dye fixation agents.

---

This invention relates to new chemical compounds, and more particularly, to new sulfuryl azides and a method for their preparation.

The compounds of this invention have the formula $XSO_2N_3$ wherein X is Cl or F. These compounds are prepared by bringing together at least one ionic azide, i.e., $N_3^-$, and at least one of (a) $SO_2X_2$ wherein X is at least one of Cl and F and (b) $SO_2$ and at least one chlorine or fluorine carrier less active in the system than $Cl_2$ and $F_2$.

Any ionic azide salt having a cation inert to the other reactive moieties can be used in the process of this invention. If azides having cations capable of substitution by chlorine or fluorine are used, preferably the azide is reacted with sulfuryl halide rather than $SO_2$ and chlorinating or fluorinating agent. Examples of ionic azides include ammonium azides such as $NH_4N_3$, $(CH_3)_4N^+N_3^-$ and $(C_6H_5CH_2)_2(CH_3)_2N^+N_3^-$; alkali metal azides such as $NaN_3$, $LiN_3$, $KN_3$, $RbN_3$ and $CsN_3$; alkaline earth metal azides such as $Ca(N_3)_2$; and $AgN_3$. Alkali metal azides are particularly preferred because of their reactivity, availability and cost.

The sulfuryl dihalides which can be used in this invention are $SO_2Cl_2$, $SO_2F_2$ and $SO_2FCl$.

The halogenating agents, i.e., halogen carriers, employed should not form derivatives with the ionic azide more stable than the compounds of this invention. Also, they should be less active than molecular chlorine or fluorine since these materials react explosively in the system. Preferably, they are liquid or gaseous for ease of metering. Examples of such halogen carriers include ClF and Group IV-A, V-A and VI-A (Lange's Handbook of Chemistry, 7th Ed. pages 58 and 59 (1949)) chlorides (including oxychlorides) of atomic number 6 to 51 and fluorides (including oxyfluorides) of atomic number 14 to 51, and particularly the aforesaid chloride and fluorides of carbon nitrogen, silicon, phosphorus and sulfur. Examples of such agents are FCl, $S_2Cl_2$, $SCl_2$, $CCl_4$, $SiCl_4$, $PCl_3$, $PCl_5$, $SbF_3$, $SF_4$, $SbF_5$, $SF_3Cl_2$, N-chlorosuccinimide, $COCl_2$ and $SiF_4$. Of these $COCl_2$ and $SiF_4$ are particularly preferred because of their optimum reactivity in the process of this invention.

The equivalent ratio of $—SO_2X/N_3^-$ usually is about from 0.5 to 10, and preferably 1 to 5 equivalents. When liquid sulfur dioxide is used as a reactant, usually about 5 to 50 equivalents of $SO_2$ per equivalent of azide, and preferably, 10 to 25 equivalents of $SO_2$ per equivalent of azide are used. The amount of halogenating agent used with the sulfur dioxide usually is about 1 to 10 equivalents of halogenating agent, and preferably, 1 to 4 equivalents of halogenating agent per equivalent of azide. Equivalents of sulfuryl halide, azide, $SO_2$ and halogenating agents as used above refers to the weight of reactant needed to provide one chemical equivalent weight, e.g., gram equivalent weight, of $XSO_2^+$, $N_3^-$, $SO_2$ or $X^-$ in the above reaction.

Although solvents, diluents, and catalysts are not essential to the formation of the product, it has been found advantageous to employ a small amount of dimethylformamide to serve as a reaction promoter. When small amounts (ranging from 1 to 20 moles of dimethylformamide per 100 moles of azide) are present, the yields are more uniform and on the average higher, usually consistently exceeding 90%.

Inert solvents can also be used to provide a heat sink, facilitate mixing of the reactants, and suppress the formation of undesirable by-products. These solvents include halogenated solvents such as $CH_2Cl_2$, $CHCl_3$ and $CCl_4$, hydrocarbons such as hexane, as well as ethers like ethyl ether. Sulfur dioxide is the preferred solvent when a chlorinating or fluorinating agent is used as a starting material.

The reaction usually takes place at temperatures in the range of $-80$ to $+100°$ C., the preferred range being between 0° to 50° C. Within this range, the reaction occurs within a reasonable time period and side reactions are minimized. While pressure is not a critical variable in the process of this invention, usually a pressure of ½ to 10 atmospheres, and preferably, 1 to 5 atmospheres is used. Usually the reaction time varies from one hour to two or three days, and preferably, from one to twenty-four hours.

The product mixture from the reaction vessel, containing unreacted starting materials and by-products, can be separated by boiling out the low-boiling solvents and reactants at reduced pressure. The product is subsequently distilled or diluted with an inert solvent and filtered.

The new compounds, sulfuryl azide chloride and sulfuryl azide fluoride are colorless oils which boil at 116–117° C. and approximately 80° C., respectively and are identified by the following spectra:

$ClSO_2N_3$

Infrared spectrum—bands and assignments are as follows:

4.62μ   asymmetric $N_3$ stretching
7.05μ   S—O stretching
8.40μ   symmetric $N_3$ stretching
8.56μ   S=O stretching
13.01μ   ——

Mass spectrum

| M./e. | Relative abundance, percent | Assignment |
| --- | --- | --- |
| 141 | 26 | $ClSO_2N_3^+$ |
| 106 | 100 | $SO_2N_3^+$ |
| 99 | 90 | $ClSO_2^+$ |
| 83 | 13 | $ClSO^+$ |
| 78 | 21 | $SO_2N^+$ |
| 64 | 51 | $SO_2^+$ |
| 48 | 44 | $SO^+$ |
| 42 | 33 | $N_3^+$ |

$FSO_2N_3$

Infrared spectrum—bands and assignments are as follows:

4.59μ   $N_3$ asymmetric stretching
6.80μ   S=O stretching
8.12μ   S—O stretching
8.45μ   $N_3$ symmetric stretch
12.08μ   ——
12.85μ   ——

Mass spectrum

| M./e. | Relative abundance, percent | Assignment |
|---|---|---|
| 125 | 100 | $FSO_2N_3^+$ |
| 106 | 5.5 | $SO_2N_3^+$ |
| 97 | 52.6 | $FSO_2N^+$ |
| 83 | 97.9 | $FSO_2^+$ |
| 78 | 17.3 | $SO_2N^+$ |
| 67 | 79.9 | $FSO^+$ |
| 64 | 28.6 | $SO_2^+$ |
| 51 | 8.1 | $FS^+$ |
| 48 | 48.2 | $SO^+$ |
| 42 | 73.9 | $N_3^+$ |

The azido and sulfuryl groups on the products of this invention make them versatile chemical intermediates. For example, fluorine can be bubbled through sulfuryl azide fluoride at room temperature or lower to give $FSO_2NF_2$ which can be used as a polymerization initiator for fluorocarbons, e.g., tetrafluoroethylene. Sulfuryl azide chloride also can be used as a polymerization initiator, a cross-linking agent and a polymer curing agent. Sulfuryl azide fluoride also can be used as an insecticide and fumigant.

In the following examples, parts and percenatges are by weight except as otherwise noted.

Example I

To a flask equipped with a Delmar-Urry greaseless valve is added 80 parts of dry 95% lithium azide and 4.7 parts of dimethylformamide. The flask is evacuated and 498 parts of sulfuryl chloride flhoride are condensed inside by cooling the flask with liquid nitrogen. The valve is closed and the flask is allowed to warm to room temperature while contents are stirred with a magnetic stirring bar. After 19 hours, the flask is cooled in liquid nitrogen and 0.3 part of non-condensable gas pumped out. Trap to trap distillation on a high vacuum line gives 209 parts (95.3% yield) of sulfuryl azide chloride, a colorless oil boiling at 116 to 117° C.

Example II

To 500 parts of dry, recrystallized sodium azide in a flask imbedded in a polyurethane block is added 500 parts of freshly distilled sulfuryl dichloride. A calcium sulfate-filled drying tube is set in the top of the flask which is then left at room temperature for about 60 hours. The reaction is quenched by adding 20 ml. of crushed ice. The product is extracted into methylene chloride, washed with ice water, and dried over calcium sulfate. Distillation of the methylene chloride leaves 144 parts of sulfuryl azide chloride (27.5% yield).

Example III

Using a procedure similar to that of Example I, 50 parts of dry sodium azide, 1210 parts of dry sulfur dioxide, and 208 parts of phosgene are allowed to react for 21 hours at room temperature. At the end of the reaction period, the reaction vessel is cooled in liquid nitrogen and 12.5 parts of non-condensable gas is pumped out. The product is isolated by trap to tap distillation on a high vacuum line and consists of 25 parts of a colorless liquid consisting of 50% $ClSO_2N_3$ and 50% $CO(N_3)_2$.

If an equivalent amount of $SiF_4$ is substituted for phosgene in the procedure of this example $FSO_2N_3$ is obtained.

Example IV

Using a procedure similar to Example I, 125 parts of dry sodium azide, 4.7 parts of dimethylformamide, and 580 parts of sulfuryl chloride fluoride are allowed to react for 3 hours at room temperature. The reaction flask is subsequently cooled in liquid nitrogen and the non-condensable gas is pumped out. Sulfuryl azide chloride is isolated by trap to trap distillation in 79.5% yield.

If an equivalent amount of $NH_4N_3$ or $Ca(N_3)_2$ is substituted for $NaN_3$ in the procedure of this example, $ClSO_2N_3$ also is obtained.

Example V

A mixture of 25 parts of dry lithium azide, 450 parts of dimethyl ether, 9 parts of dry dimethylformamide, and 102 parts of sulfuryl difluoride is prepared and stirred 19 hours at room temperature. The reaction flask is then cooled in liquid nitrogen and 2 parts of non-condensable gas is pumped out. The poduct, sulfuryl azide fluoride is isolated by trap to trap distillation and consists of 27 parts of a colorless liquid boiling at about 80° C. (about 35% yield).

Example VI

This example illustrates the use of $ClSO_2N_3$ as a dye fixation agent. A one-inch square piece of polypropylene cloth is heated under vacuum with 0.08 ml. of $ClSO_2N_3$ for 17 hours at 117° C. All volatiles are distilled from the flask and a solution of 1-amino-5-methoxyanthraquinone in chloroform is introduced near room temperature for 15 minutes. The cloth is then washed thoroughly with $CHCl_3$, dimethylformamide, and $CH_2Cl_2$. The cloth is dyed a light orange color. If the treatment with $ClSO_2N_3$ is omitted, the cloth is not dyed on immersion in the 1-amino-5-methoxyanthraquinone solution.

What is claimed is:
1. A compound of the formula $XSO_2N_3$, wherein X is Cl or F.
2. A compound of claim 1 of the formula $FSO_2N_3$.
3. A compound of claim 1 of the formula $ClSO_2N_3$.
4. A process which comprises contacting $N_3^-$ with at least one of (a) $SO_2X_2$ wherein X is at least one of Cl and F and (b) $SO_2$ and at least one chlorine or fluorine carrier less active than $Cl_2$ and $F_2$.
5. A process of claim 4 wherein an alkali metal azide is contacted with sulfuryl halide.
6. A process of claim 5 carried out in the presence of dimethyl formamide.
7. A process of claim 4 wherein alkali metal azide is contacted with said halogen carrier and $SO_2$.
8. A process of claim 7 wherein alkali metal azide is contacted with $SO_2$ and $COCl_2$.

References Cited

UNITED STATES PATENTS 3,357,804  12/1967  Appel _____ 23—357
3,376,117  4/1968  Sausen _____ 23—357

EARL C. THOMAS, *Primary Examiner.*

H. S. MILLER, *Assistant Examiner.*

U.S. Cl. X.R.

8—14